(12) United States Patent  
Kimball

(10) Patent No.: US 6,407,507 B1
(45) Date of Patent: *Jun. 18, 2002

(54) PERSONAL ELECTRONIC DEVICE HAVING EL LAMP AND BUZZER POWERED FROM A SINGLE INDUCTOR

(75) Inventor: Robert Allen Kimball, Gilbert, AZ (US)

(73) Assignee: Durel Corporation, Chandler, AZ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 815 days.

(21) Appl. No.: 08/647,223

(22) Filed: May 9, 1996

(51) Int. Cl.[7] .............................................. H05B 37/00
(52) U.S. Cl. ................ 315/169.3; 315/209 R; 315/240; 315/283
(58) Field of Search .......................... 315/169.3, 209 R, 315/226, 283, 240, 224, 307, DIG. 5, DIG. 7, 129

(56) References Cited

U.S. PATENT DOCUMENTS

| | | | |
|---|---|---|---|
| 4,527,096 A | 7/1985 | Kindlmann | 315/169.3 |
| 4,529,322 A | 7/1985 | Ueda | 368/255 |
| 5,313,141 A | 5/1994 | Kimball | 315/169.3 |
| 5,418,434 A * | 5/1995 | Kamens et al. | 315/169.3 |

* cited by examiner

*Primary Examiner*—David Vu
(74) *Attorney, Agent, or Firm*—Paul F. Wille

(57) ABSTRACT

A personal electronic device includes and inverter having a single inductor for powering an EL lamp and a buzzer. The lamp and the buzzer are coupled together to the output of the inverter and are in parallel with each other or are coupled in series between a source of direct current and ground.

17 Claims, 2 Drawing Sheets

PERSONAL ELECTRONIC DEVICE HAVING EL LAMP AND BUZZER POWERED FROM A SINGLE INDUCTOR

BACKGROUND OF THE INVENTION

This invention relates to personal electronic devices, such as wristwatches, pocket pagers, calculators, and organizers, having an EL lamp and a piezoelectric buzzer powered from a single inductor.

An EL lamp is essentially a capacitor having a dielectric layer including a phosphor powder which glows in the presence of a strong electric field and a very low current. The dielectric layer is held between two electrodes, one of which is transparent. Because the EL lamp is a capacitor, an alternating current (AC) must be applied to cause the phosphor to glow, otherwise the capacitor charges to the applied voltage and the current through the EL lamp ceases.

For personal electronic devices such as wristwatches, pocket pagers, and cellular telephones, an EL lamp is driven by an inverter which converts direct current from a small battery into alternating current. In order for an EL lamp to glow sufficiently, a peak to peak voltage in excess of about one hundred and twenty volts is necessary. The actual voltage depends on the construction of the lamp and, in particular, the field strength within the phosphor powder.

While there are many ways to increase voltage, e.g. by using a transformer or a voltage doubler, most applications for an EL lamp use what is known as a "flyback" inverter in which the energy stored in an inductor is supplied to the EL lamp as a small pulse of current at high voltage. The inverter typically operates at high frequency (4 khz. or more) to minimize the size of the magnetics, i.e. the inductor or transformer, in the inverter.

FIG. 1 is based upon the disclosure of U.S. Pat. No. 4,527,096 (Kindlmann). When transistor 14 turns on, current flows through inductor 15, storing energy in the magnetic field generated by the inductor. When transistor 14 shuts off, the magnetic field collapses at a rate determined by the turn-off characteristics of transistor 14. The voltage across inductor 15 is proportional to the rate at which the field collapses ($\delta i/\delta t$). Thus, a low voltage and large current is converted into a high voltage at a small current.

The current pulses are coupled through diode 16 to the DC diagonal of a switching bridge having EL lamp 12 connected across the AC diagonal. Assuming that transistors 18 and 19 are conducting, the same amount of energy is supplied to lamp 12 each time transistor 14 turns off and, therefore, the voltage on the lamp is pumped up by a series of current pulses from inductor 15 as transistor 14 repeatedly turns on and off. Diode 16 prevents lamp 12 from discharging through transistor 14. If transistor 14 were switched on and off continuously, the pulses would charge lamp 12 to the maximum voltage available from inductor 15, e.g. about 140 volts. Since an EL lamp needs an alternating current or a variable direct current, the lamp would glow initially and then extinguish when the capacitance of the lamp became fully charged.

To avoid this problem, the transistors in opposite sides of the bridge alternately conduct to reverse the connections to lamp 12. The bridge transistors switch at a lower frequency than the frequency at which transistor 14 switches. The four bridge transistors are high voltage components, adding considerably to the size and cost of the circuit. In addition, the circuit is not single ended, i.e. one cannot ground one side of lamp 12, which is preferred.

One could use separate inverters for driving an EL lamp and a buzzer. In many applications, particularly watches, a second inverter is difficult to add, primarily because of the cost of a second inductor. It is known in the art to power a piezoelectric buzzer and an EL lamp from a single flyback inverter. FIG. 2 is based upon the disclosure of U.S. Pat. No. 4,529,322 (Ueda). In inverter 20, transistor 14 is switched on and off at about 8 khz. to charge lamp 12. When transistor 21 is conducting, lamp 12 is discharged.

There is an average DC bias across lamp 12, approximately equal to one half the maximum voltage, because the lamp is charged in only one direction and then discharged. DC bias on an EL lamp can cause corrosion and shorting of the electrodes of the lamp, particularly at elevated temperature and humidity, decreasing the life of the lamp.

Another problem with inverter 20 is that transistors 21 and 22 draw current from terminal 13 through inductor 15. This current is wasted since it does not contribute to powering lamp 12, thereby reducing the efficiency of the inverter and decreasing battery life.

A third problem with inverter 20 is that switch 25 is necessary for isolating piezoelectric buzzer 26 from the high voltage pulses applied to lamp 12. High voltage pulses stress the piezoelectric element and can cause failure. In the Ueda patent, switch 25 is one of two ganged switches actuated by undisclosed means.

FIG. 3 is based upon the disclosure of U.S. Pat. No. 5,313,117 (Kimball). Inverter 30 includes transistor 31, inductor 32, and transistor 33 connected in series between voltage source 34 and ground. Inductor 32 is alternately connected through transistors 35 and 37 to lamp 27. Diode 36 is connected in a series with transistor 35 for preventing the transistor from operating in the inverse active mode, i.e. preventing transistor 35 from conducting current from the ground terminal through the forward bias based-collector junction when the voltage on lamp 27 is negative. Similarly, diode 38 prevents transistor 37 from operating in the inverse active mode when the voltage on lamp 27 is positive and greater than the battery voltage. The transistors, resistors, and diodes are implemented on a single chip. The inductor and capacitors are external devices coupled to the chip on a printed circuit board.

External logic circuitry provides a series of pulse bursts alternately on output lines "X" and "Y". These bursts are coupled to the bases of transistors 31 and 33 and cause the transistors to conduct alternately, thereby providing positive and negative half wave voltages to lamp 27. Inverter 30 produces alternating current at a single ended output and one side of lamp 27 can be grounded.

It remains a problem in the art to drive an EL lamp and a buzzer from a single inverter with as few components as possible with no waste current and with no DC bias.

In view of the foregoing, it is therefore an object of the invention to provide a personal electronic device with an inverter having a single inductor for providing alternating current to an EL lamp and direct current pulses to a buzzer.

Another object of the invention is to provide a personal electronic device with an inverter having no waste current.

Another object of the invention is to provide a personal electronic device with an inverter having no DC bias.

SUMMARY OF THE INVENTION

The foregoing objects are achieved in this invention in which a personal electronic device includes an inverter having an output coupled to the junction of an EL lamp and a buzzer. The lamp and the buzzer are coupled in parallel with each other to ground or are coupled in series between a DC supply and ground.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 4:
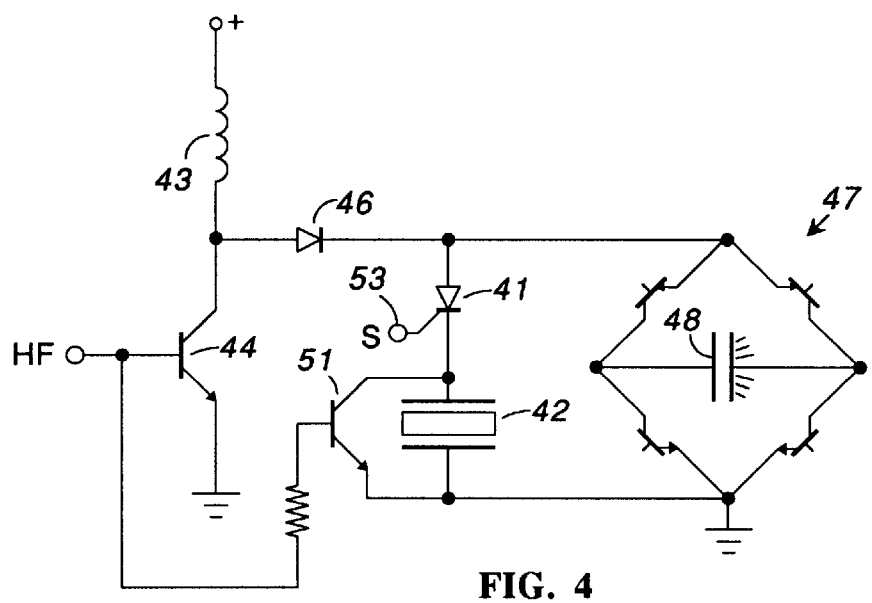
FIG. 4 is a schematic of an inverter constructed in accordance with the invention.

FIG. 4 illustrates an inverter constructed in accordance with the invention in which an EL lamp and a buzzer are coupled in parallel between the output of an inverter and ground. SCR 41 isolates buzzer 42 from the pulses produced by inductor 43 and transistor 44. The pulses are coupled by diode 46 to bridge 47 where they are converted into alternating current through lamp 48. Transistor 51 operates in synchronism with transistor 44 to discharge any charge accumulated on buzzer 42. Buzzer 42 sounds when a high voltage is applied to signal input 53. Because of the alternating current through lamp 48, no separate discharge circuitry is needed and there is no waste current. Transistor 51 does not produce waste current because the transistor operates in synchronism with transistor 44.

Figure 5:
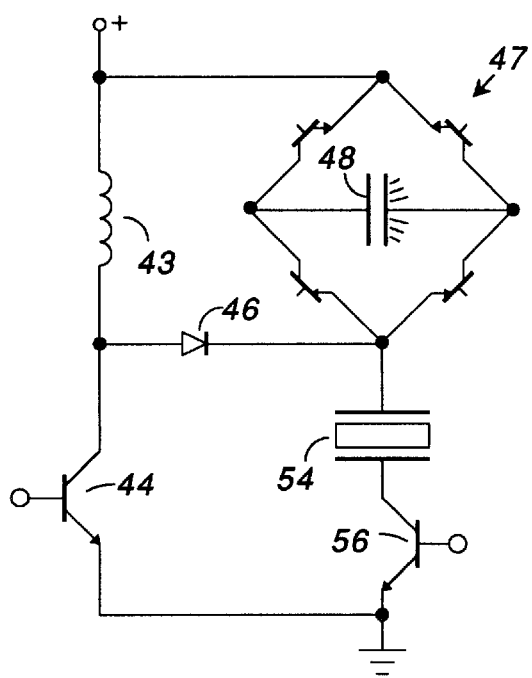
FIG. 5 is a schematic of an inverter constructed in accordance with an alternative embodiment the invention.

FIG. 5 illustrates an inverter constructed in accordance with another aspect of the invention in which the EL lamp and the buzzer are coupled in series across the low voltage supply. In this embodiment, transistor 56 isolates buzzer 54 from the pulses produced by inductor 43 and transistor 44. The pulses are coupled by diode 46 to the junction of bridge 47 and buzzer 54. When transistor 56 is non-conducting, the pulses are applied to EL lamp 48 by bridge 47 to produce an alternating current through the lamp.

For many applications, lamp 48 has a capacitance of about 3 nf and buzzer 54 has a capacitance of 10–15 nf. When transistor 56 is conducting, the pulses are coupled substantially through buzzer 54, which has a much lower impedance than lamp 48. Thus, only the buzzer appears to operate. Because of the impedance difference, only transistor 56 is needed to select between operating the lamp and operating the buzzer, simplifying the circuit. The operation of transistor 56 need not be synchronized with the operation of transistor 44, further simplifying the circuitry.

Figure 1:
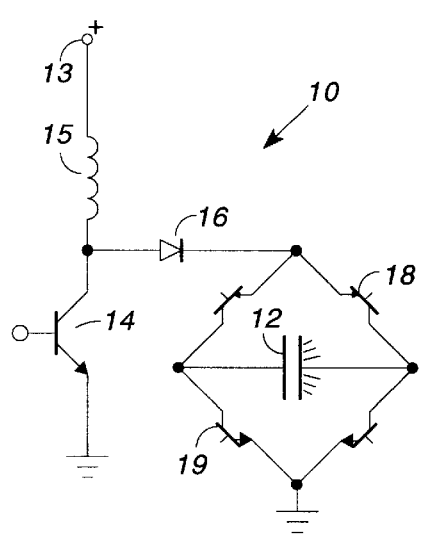
FIG. 1 is a schematic of an inverter of the prior art.
Figure 2:
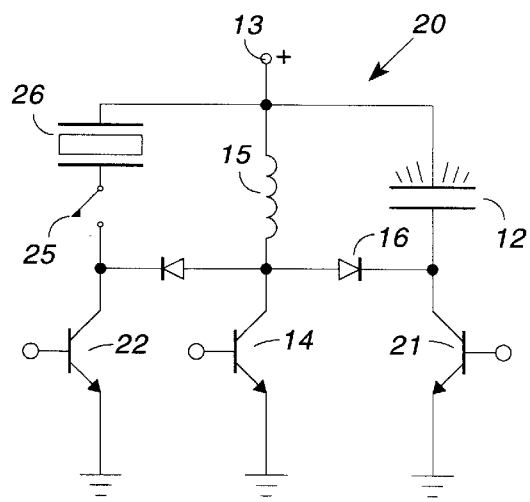
FIG. 2 is a schematic of an inverter of the prior art for powering an EL lamp and a piezoelectric buzzer.
Figure 3:
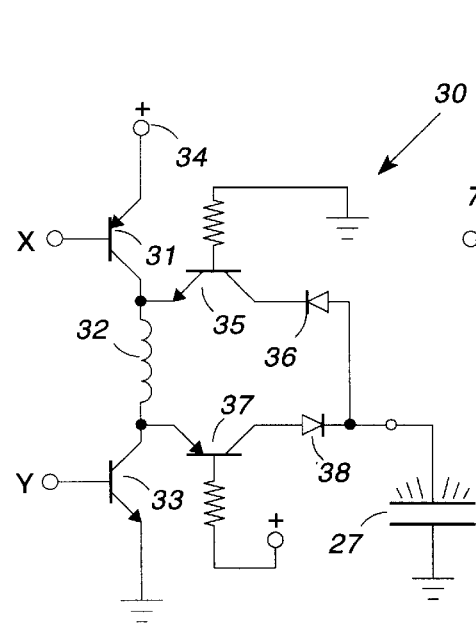
FIG. 3 is a schematic of an inverter of the prior art having a single ended output.
Figure 6:
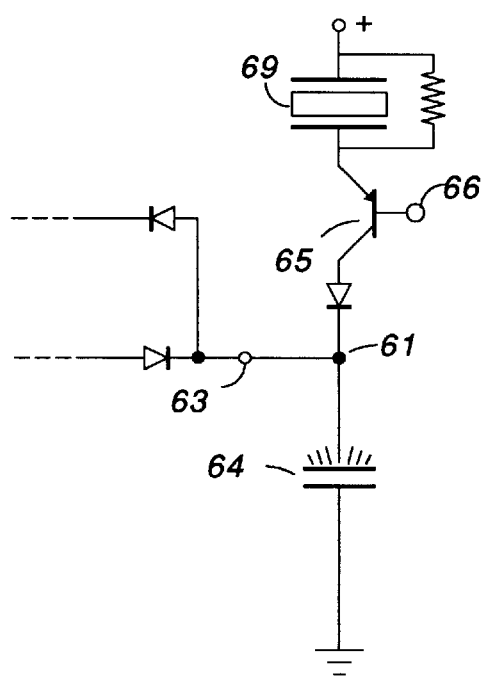
FIG. 6 is a schematic of an inverter constructed in accordance with a preferred embodiment of the invention.

In FIG. 6, the EL lamp and the buzzer are coupled in series between supply and ground. Junction 61 is coupled to output 63 of an inverter constructed as illustrated in FIG. 3. Lamp 64 is lit as long as the inverter is operating and as long as transistor 65 is not conducting. Applying a signal to input 66 causes transistor 65 to conduct and substantially all the current from the inverter goes through buzzer 69, sounding the buzzer and extinguishing lamp 64.

Figure 7:
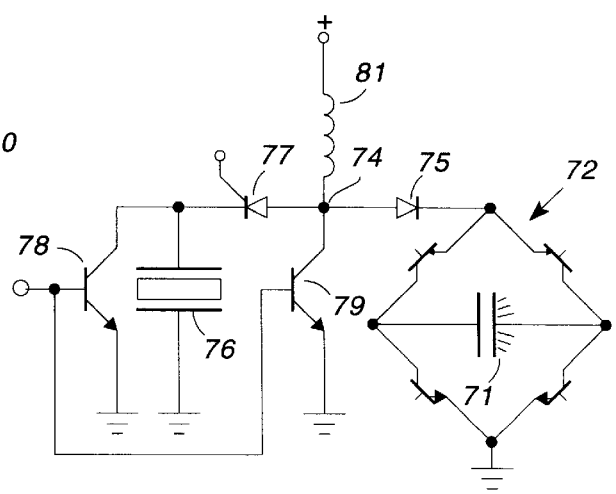
FIG. 7 is a variation of the embodiment shown in FIG. 4.

In FIG. 7, EL lamp 71 is connected to the AC diagonal of bridge 72 and the DC diagonal of the bridge is coupled to junction 74 by diode 75 and to ground. Buzzer 76 is coupled to junction 74 by SCR 77 and is discharged by transistor 78, which is connected in parallel with the buzzer. The base of transistor 78 is coupled to the base of transistor 79 and the two transistors switch together, thereby avoiding waste current when discharging buzzer 76. Buzzer 76 is sounded by turning on SCR 77, causing pulses from inductor to be coupled to the buzzer. Bridge 72 is off, preventing lamp 71 from being charged or discharged.

The invention thus provides an inverter for powering an EL lamp or a buzzer by providing AC for the lamp and pulsed DC for the buzzer. Waste current is eliminated by eliminating transistors coupled in parallel with the switch transistor in series with the inductor.

Having thus described the invention, it will be apparent to those of skill in the art that various modifications can be made within the scope of the invention. For example, one can interchange power and ground or substitute PNP transistors for NPN transistors, and vice-versa.

What is claimed as the invention is:

1. A power supply for producing pulses from direct current to operate an EL lamp and a buzzer, said power supply comprising:
    an inductor and a first transistor connected in series between a source of said direct current and ground and having a junction therebetween;
    an output terminal;
    a diode coupling said junction to said output terminal;
    wherein said EL lamp and said buzzer are each coupled to said output terminal;
    a semiconductor switch coupled in series with said buzzer, wherein said switch and said buzzer are coupled between said output terminal and ground.

2. The power supply as set forth in claim 1 and further comprising:
    a switching bridge having a DC diagonal connected between said output terminal and ground, wherein said EL lamp is connected across an AC diagonal of said bridge.

3. The power supply as set forth in claim 1 wherein said EL lamp is coupled between said output terminal and said source, thereby making a series circuit with said buzzer between said source and ground.

4. The power supply as set forth in claim 1 and further comprising:
    a second transistor coupled between said inductor and said source, wherein said first transistor and said second transistor conduct alternately to produce an alternating current at said output.

5. The power supply as set forth in claim 1 wherein said semiconductor switch is an SCR.

6. The power supply as set forth in claim 1 wherein said semiconductor switch is a transistor.

7. A personal electronic device having an EL lamp and a buzzer, said device comprising:
    a low voltage source of direct current;
    an inverter coupled to said source for converting direct current into high voltage pulses, said inverter including a single inductor and an output;
    a buzzer having a first terminal and a second terminal;
    an EL lamp having a first terminal and a second terminal;
    wherein the first terminal of said EL lamp is coupled to the first terminal of said buzzer and to said output.

8. The personal electronic device as set forth in claim 7 and further comprising:
    a switching bridge having a DC diagonal connected between said output terminal and ground, wherein said EL lamp is connected across an AC diagonal of said bridge.

9. The personal electronic device as set forth in claim 8 wherein said buzzer is coupled between said output terminal and ground, thereby making a parallel circuit with said EL lamp between said output terminal and ground.

10. The personal electronic device as set forth in claim 9 and further including a transistor coupled in parallel with said buzzer for dissipating charge accumulated on said buzzer.

11. The personal electronic device as set forth in claim 7 wherein said EL lamp is coupled between said output terminal and said source and said buzzer is coupled between said output terminal and ground, thereby making a series circuit with said buzzer between said source and ground.

12. The personal electronic device is set forth in claim 11 and further comprising:
  a switching bridge having a DC diagonal connected between said output terminal and said source, wherein said EL lamp is connected across an AC diagonal of said bridge.

13. The personal electronic device as set forth in claim 7 wherein said EL lamp is coupled between said output terminal and ground and said buzzer is coupled between said output terminal and said source, thereby making a series circuit with said buzzer between said source and ground.

14. The personal electronic device as set forth in claim 13 wherein said second terminal of said EL lamp is grounded and wherein the second terminal of said buzzer is coupled to said source.

15. The personal electronic device as set forth in claim 14 and further including a normally non-conducting transistor connected between the first terminal of said buzzer and said output terminal for controlling the sounding of said buzzer.

16. A power supply for producing pulses from direct current to operate an EL lamp and a buzzer, said power supply comprising:
  an inductor and a first transistor connected in series between a source of said direct current and ground and having a junction therebetween;
  a switching bridge having an AC diagonal and a DC diagonal;
  an EL lamp coupled across the AC diagonal of said bridge;
  a diode coupling said junction to a first end of said DC diagonal; and
  an SCR coupling said buzzer across said DC diagonal.

17. The power supply as set forth in claim 16 and further including:
  a second transistor in parallel with said buzzer for discharging said buzzer;
  wherein the control electrodes of said first transistor and said second transistor are coupled together.

\* \* \* \* \*